UNITED STATES PATENT OFFICE.

VIGGO DREWSEN, OF BROOKLYN, NEW YORK, ASSIGNOR TO WEST VIRGINIA PULP & PAPER COMPANY, OF NEW YORK, N. Y., A CORPORATION OF DELAWARE.

PROCESS FOR THE TREATMENT OF WASTE SODA LIQUORS.

1,298,481.     Specification of Letters Patent.     Patented Mar. 25, 1919.

No Drawing. Application filed June 10, 1914, Serial No. 844,254. Renewed August 10, 1918. Serial No. 249,331.

*To all whom it may concern:*

Be it known that I, VIGGO DREWSEN, a citizen of the United States, and resident of the borough of Brooklyn, county of Kings, city and State of New York, have made a certain new and useful Invention Relating to Processes for the Treatment of Waste Soda Liquors, of which the following is a specification.

This invention relates especially to the treatment of waste liquor which is commonly known as black liquor produced especially when paper pulp is manufactured from deciduous woods, such as poplar or from other similar acting material such as straw, flax, and so forth, by the caustic soda process. The waste soda liquor may with advantage be first delignated by having the greater proportion of its dissolved or suspended woody material precipitated by the action of carbon-dioxid preferably under conditions of heat and pressure and the delignated liquor may be filtered from this precipitate and causticized with powdered quicklime preferably after further concentration. The proportion of lime is preferably such as to produce substantially dry powdered, lime organic material which preferably is treated with carbon-dioxid and moisture to aggregate the lime particles and then after heating to 160 degrees or more if desired, the causticized material may be leached with cold water to dissolve without undesirable admixture the sodium acetate which may be separated by evaporation, crystallization and so forth.

In carrying out this process the soda waste liquor is preferably concentrated so that it contains not more than about sixty (60) per cent. of water, say only about 50 per cent. of water so as to have a specific gravity of about 1.28. This concentrated waste liquor in which the organic compounds or ligneous material are dissolved or suspended may be first heated to a temperature of 70 to 90 degrees centigrade or thereabout and then treated under suitable pressure with carbon-dioxid until it is substantially saturated therewith. Good results may be secured by maintaining a pressure of 50 to 100 pounds per square inch during this ligneous precipitation process which seems to precipitate from this concentrated liquor the bicarbonate of soda and woody or organic material which when sufficient heat and pressure are maintained seems to cohere or gather together into particles of sufficient size so as to be readily separated by filtering operations. The treated material may then be filtered while still hot if desired and a satisfactory separation can be secured by the use of an ordinary filter press. This ligneous precipitate which represents a large proportion of the original lignin and other dissolved organic solid material in the black liquor may be further treated for recovery of the soda therefrom and for utilization of the organic material by steam distillation or various other recovery processes so as to secure valuable oils, solvents and other material.

The filtrate or delignated waste liquor which usually has a dark or black color somewhat similar to the original black liquor may with advantage be further concentrated to about half its original weight and then mixed or incorporated with powdered or finely divided quicklime to the extent of about 50 per cent. of its weight so as to secure a vigorous reaction as this quicklime is slaked while in intimate contact with the delignated waste liquor and generates considerable heat which in some instances may be retained to exert a desirable action on the treated material by promoting combination between the lime and organic material. Suitable agitation should be maintained during this reaction to prevent settling and promote uniform conversion of the organic compounds into more insoluble form in this lime organic material. The proportion of quicklime used in this causticizing treatment is so proportioned in connection with the amount of water in the concentrated liquor that by chemical absorption and evaporation practically all of the sensible water or moisture is driven off and a causticized substantially dry powder is produced in which the lime seems to have combined more or less with the remaining organic material.

It seems desirable in order to facilitate the subsequent filtration to get the lime into the form of larger particles and this may be effected by further treatment with carbon-dioxid which may be allowed to percolate or pass through or over the substantially dry material preferably after the carbon-dioxid has been allowed to bubble up through water or be otherwise moistened to facilitate this aggregating action. This carbon-dioxid treatment need not, however, be carried to complete neutralization of the alkaline material, but only far enough to remove the objectionable fineness of the slaked lime which is usually present in excess. It also seems desirable to heat the resulting substantially dry material at a suitable high temperature which seems to complete the reaction between the lime and the organic components as is evidenced by the evolution of some volatile organic material during this part of the process. The material may be heated to about 160 to 200 degrees centigrade or so for about an hour which seems to give good results with black soda pulp liquor resulting from the treatment of poplar wood, for instance.

The heated causticized mixture is now leached out with cold water of sufficiently low temperature so as not to dissolve undesirable organic components to an objectionable extent. Good results can be secured when this leaching water is at a temperature of about ten to fifteen degrees centigrade or less and it is of course undesirable to use an unnecessarily large amount of this leaching water or other liquid. While agitation promotes this leaching process it is not usually necessary since the water may be allowed to percolate through the causticized material in a percolator or the like, giving a brownish tinged or coffee colored liquid which contains a large proportion of sodium acetate. By concentrating the leaching liquor the sodium acetate may be recovered in crystalline form as by cooling the concentrated liquor to about 0° centigrade or so, the concentration and crystallization being repeated as necessary; and the crystals may be subjected to the usual purifying processes, if desired. In this way by first separating the large proportion of the woody material from the waste soda liquor, the sodium or other acetate material may be effectively recovered in large quantities from the delignated liquor, without destruction or waste of these valuable components during the other recovery processes to which the precipitated ligneous material may be subjected.

This invention has been described in connection with a number of illustrative ingredients, temperatures, pressures, conditions, and character and order of steps, to the details of which disclosure the invention is not of course limited.

What is claimed as new and what is desired to be secured by Letters Patent is set forth in the appended claims:

1. The process of treating the waste soda liquor produced in the manufacture of wood pulp from poplar wood by the soda pulp process, which consists in concentrating the waste liquor by evaporation until the proportion of water in the concentrated material is only about fifty per cent. in delignating the waste liquor by largely precipitating therefrom the ligneous material and sodium bicarbonate by treatment with carbon-dioxid while heating the liquor under pressure to promote the collection of the precipitated material, in filtering the treated liquor to separate from the precipitate the delignated waste liquor, in concentrating the said delignated waste liquor and incorporating therewith about half its weight of powdered quicklime to produce causticized substantially dry, powdered, lime organic material, in aggregating the hydrated lime particles by treatment with carbon-dioxid and moisture, in heating the treated causticized material to about 160 to 200 degrees C., in leaching said causticized material with relatively small proportions of cold water to leach out the sodium acetate free from interference by undesirable organic material and in concentrating and separating by crystallization sodium acetate from the leaching liquor.

2. The process of treating the waste soda liquor produced in the manufacture of wood pulp from deciduous wood, by the soda pulp process, which consists in concentrating the waste liquor by evaporation until the proportion of water in the concentrated material is not more than about sixty per cent., in delignating the waste liquor by largely precipitating therefrom the ligneous material and sodium bicarbonate by treatment with carbon-dioxid while heating the liquor under pressure to promote the collection of the precipitated material, in filtering the treated liquor to separate from the precipitate the delignated waste liquor, in concentrating the said delignated waste liquor and incorporating therewith quicklime to produce causticized substantially dry, powdered, lime organic material, in heating the treated causticized material to about 160 to 200 degrees C., in leaching said causticized material with relatively small proportions of cold water to leach out the sodium acetate free from interference by undesirable organic material and in concentrating and separating by crystallization sodium acetate from the leaching liquor.

3. The process of treating the waste soda liquor produced in the manufacture of wood pulp from deciduous wood by the soda pulp process, which consists in concentrating the waste liquor by evaporation until the proportion of water in the concentrated material is not more than about sixty per cent., in delignating the waste liquor by largely precipitating therefrom the ligneous material and sodium bicarbonate by treatment with carbon-dioxid while heating the liquor under pressure to promote the collection of the precipitated material, in filtering the treated liquor to separate from the precipitate the delignated waste liquor, in concentrating the said delignated waste liquor and incorporating therewith quicklime to produce causticized lime organic material, in leaching said causticized material with relatively small proportions of cold water to leach out the sodium acetate free from interference by undesirable organic material and in concentrating and separating sodium acetate from the leaching liquor.

4. The process of treating the waste soda liquor produced in the manufacture of paper pulp from deciduous wood by the soda pulp process, which consists in concentrating the waste liquor until the proportion of water in the concentrated material is only about fifty per cent. in delignating the waste liquor by largely precipitating the ligneous material therefrom without eliminating the acetate material therefrom, in concentrating the delignated waste liquor and incorporating therewith about half its weight of powdered quicklime and heating the mixture to produce causticized substantially dry, powdered, lime organic material, in leaching said causticized material with relatively small proportions of cold water to leach out the sodium acetate free from interference by undesirable organic material and in recovering by evaporation and crystallization sodium acetate from the leaching liquor.

5. The process of treating the waste soda liquor produced in the manufacture of paper pulp from deciduous wood by the soda pulp process, which consists in concentrating the waste liquor until the proportion of water in the concentrated material is only about fifty per cent., in delignating the waste liquor by precipitating ligneous material therefrom without eliminating the acetate material therefrom, in concentrating the delignated waste liquor and incorporating therewith quicklime and heating the mixture to produce causticized substantially dry, lime organic material, in leaching said causticized material with relatively small proportions of cold water to leach out the sodium acetate free from interference by undesirable organic material and in recovering sodium acetate from the leaching liquor.

6. The process of treating the waste soda liquor produced in the manufacture of cellulose from vegetable fiber material by the soda process, which consists in concentrating the waste liquor, in delignating the waste liquor without eliminating the acetate material therefrom, in concentrating the delignated waste liquor and incorporating therewith quicklime to produce causticized lime organic material, in leaching said causticized material to leach out the sodium acetate free from interference by undesirable organic material and in recovering sodium acetate from the leaching liquor.

7. The process of treating the waste soda liquor produced in the manufacture of paper pulp from deciduous wood such as poplar, etc., by the soda pulp process, which consists in delignating the waste liquor by largely precipitating the ligneous material therefrom by treatment with carbon-dioxid while heating the liquor under pressure to promote the collection of the precipitated material, in concentrating and causticizing with lime the delignated waste liquor to produce causticized substantially dry, lime organic material, in aggregating the hydrated lime particles by treatment with carbon-dioxid and moisture, in heating the treated causticized material to about 160 to 200 degrees C., in leaching the said causticized material with relatively small proportions of cold water to leach out sodium acetate free from interference by undesirable organic material and in recovering sodium acetate from the leaching liquor.

8. The process of treating the waste soda liquor produced in the manufacture of paper pulp by the soda pulp process, which consists in delignating the waste liquor, in concentrating and causticizing with lime the delignated waste liquor to produce causticized substantially dry, lime organic material, in leaching the said causticized material with relatively small proportions of cold water to leach out sodium acetate free from interference by undesirable organic material and in recovering sodium acetate from the leaching liquor.

9. The process of treating the waste soda liquor produced in the manufacture of paper pulp by the soda pulp process, which consists in delignating the waste liquor, in concentrating and causticizing the delignated waste liquor, in leaching the causticized material to leach out sodium acetate and in recovering sodium acetate from the leaching liquor.

10. The process of treating the waste soda liquor produced in the manufacture of paper pulp from deciduous wood by the soda pulp process, which consists in concentrating and delignating the waste liquor, in concentrating and causticizing with lime the delignated waste liquor and in leaching out therefrom with cold water sodium acetate free from interference by undesirable organic material.

11. The process of treating the waste soda liquor produced in the manufacture of paper pulp by the soda pulp process, which consists in concentrating and delignating the waste liquor, in concentrating and causticizing the delignated waste liquor and in leaching out therefrom sodium acetate free from interference by undesirable organic material.

12. The process of treating the waste soda liquor produced in the manufacture of cellulose by the soda process which consists in delignating the waste liquor, in concentrating and causticizing the delignated waste liquor and in leaching out therefrom sodium acetate free from substantial interference by undesirable organic material.

13. The process of treating the waste soda liquor produced in the manufacture of cellulose from deciduous wood by the soda process, which comprises concentrating and causticizing the waste liquor and leaching out therefrom acetate free from interference by undesirable organic material.

14. The process of treating the waste soda liquor produced in the manufacture of cellulose from vegetable fiber material by the caustic process which comprises concentrating the waste liquor and chemically changing some of the organic material therein and reducing its solubility to minimize subsequent interference of such organic material and in leaching the treated material to leach out acetate therefrom.

15. The process of treating the waste soda liquor produced in the manufacture of cellulose by the soda process which consists in causticizing and partially delignating the waste liquor and in leaching out acetate therefrom.

VIGGO DREWSEN.

Witnesses:
HARRY L. DUNCAN,
JESSIE B. KAY.